(12) United States Patent
Maresh

(10) Patent No.: US 9,975,068 B1
(45) Date of Patent: May 22, 2018

(54) GRAVITY FILTRATION SYSTEM

(71) Applicant: Joseph D Maresh, West Linn, OR (US)

(72) Inventor: Joseph D Maresh, West Linn, OR (US)

( * ) Notice: Subject to any disclaimer, the term of this patent is extended or adjusted under 35 U.S.C. 154(b) by 707 days.

(21) Appl. No.: 14/181,480

(22) Filed: Feb. 14, 2014

Related U.S. Application Data

(60) Provisional application No. 61/850,498, filed on Feb. 14, 2013.

(51) Int. Cl.
 *B01D 35/00* (2006.01)
 *B01D 29/60* (2006.01)
 *B01D 29/90* (2006.01)
(52) U.S. Cl.
 CPC ........... *B01D 29/605* (2013.01); *B01D 29/90* (2013.01)
(58) Field of Classification Search
 None
 See application file for complete search history.

(56) References Cited

U.S. PATENT DOCUMENTS

| 1,900,964 | A | * | 3/1933 | Weber | G01G 19/46 |
|---|---|---|---|---|---|
| | | | | | 177/170 |
| 3,031,022 | A | * | 4/1962 | Atchison | G01G 19/00 |
| | | | | | 177/230 |
| 3,552,573 | A | * | 1/1971 | Mail | B01D 23/10 |
| | | | | | 210/275 |
| 4,251,366 | A | | 2/1981 | Simon et al. | |
| 4,326,596 | A | * | 4/1982 | Beck | G01G 23/18 |
| | | | | | 177/178 |
| 4,572,527 | A | * | 2/1986 | Stafford-Mills | B60S 9/02 |
| | | | | | 180/41 |

(Continued)

*Primary Examiner* — Richard C Gurtowski
(74) *Attorney, Agent, or Firm* — Nick A Nichols, Jr.

(57) ABSTRACT

In a gravity filtration system, upper and lower fluid reservoirs may be mated together. Unfiltered fluid may be supplied to the upper reservoir. One or more filters provide fluid communication between the upper and lower fluid reservoirs. Unfiltered fluid passes through the filter into the lower filtered fluid reservoir. The weight of the fluid in the gravity filtration system may be monitored to maximize the fluid flow rate without loss of fluid by supporting the fluid reservoirs on a moveable platform interconnected to a stationary base by a force reactive linkage. Automatic fill components may be provided for automatically actuating a fluid supply valve connected to an unfiltered fluid source. As filtered fluid is withdrawn from the lower reservoir, actuation of the fluid supply valve to an open position permits unfiltered fluid to be supplied to the upper reservoir. Supply of unfiltered fluid to the upper reservoir is stopped upon actuation of the fluid supply valve to the closed position. Upon closure of the fluid supply valve, an equilibrium state in the filtration system will occur after sufficient time has elapsed for the upper fluid reservoir to drain and the filtered fluid level in the lower fluid reservoir no longer rises. Actuation of the fluid supply valve is a function of the weight of the fluid in the filtration system and/or vertical travel of the moveable platform. An indicator responsive to changes in the weight of the fluid in the filtration system may provide an indication of the equilibrium state of the filtered fluid in the lower fluid reservoir.

18 Claims, 15 Drawing Sheets

(56) References Cited

U.S. PATENT DOCUMENTS

| | | | |
|---|---|---|---|
| 5,072,660 A * | 12/1991 | Helbling | A47J 31/007 426/112 |
| 5,562,824 A | 10/1996 | Magnusson | |
| 5,567,308 A | 10/1996 | Visser | |
| 7,232,517 B1 | 6/2007 | Shepherd | |
| 2002/0060177 A1 * | 5/2002 | Conrad | C01B 13/11 210/203 |

* cited by examiner

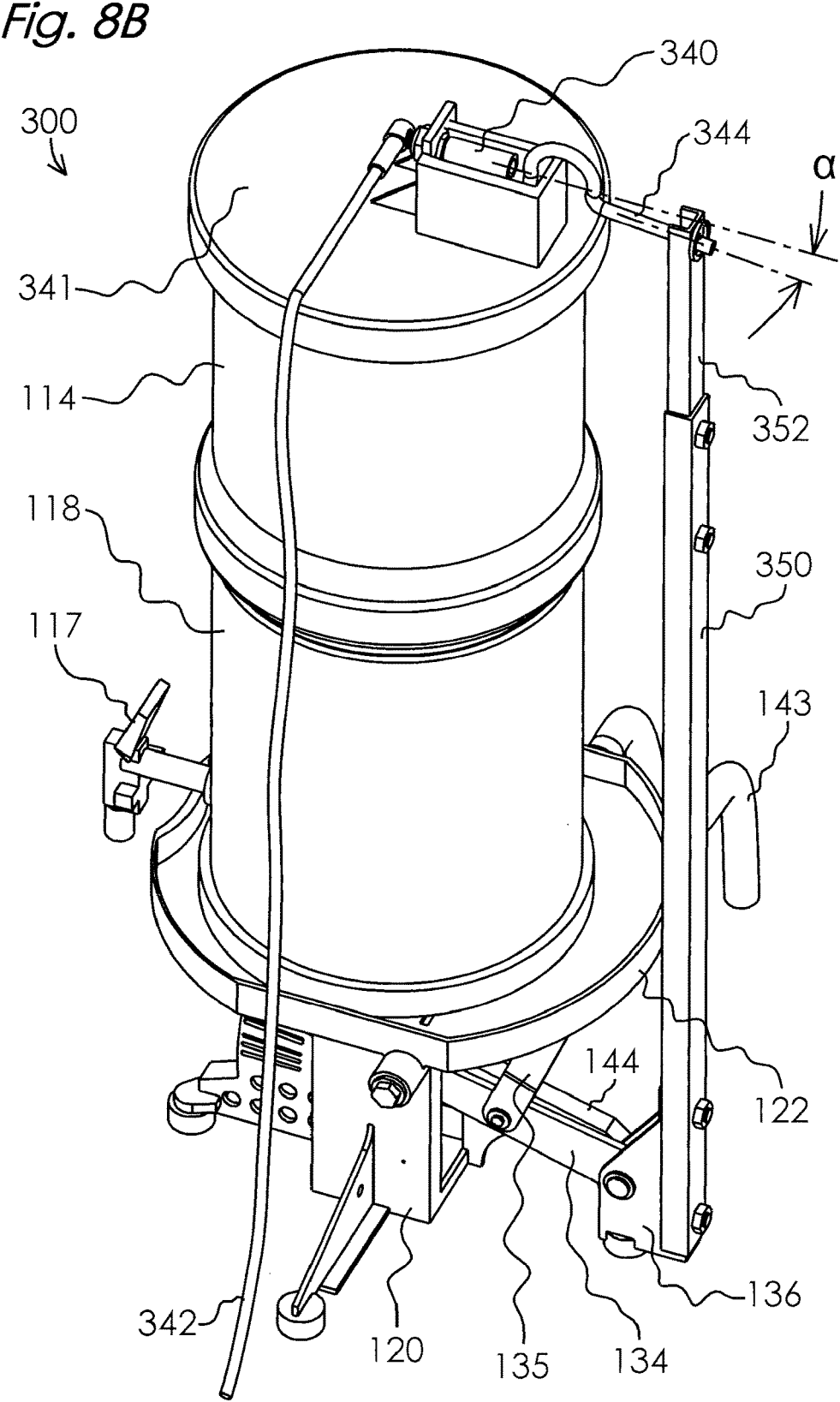

GRAVITY FILTRATION SYSTEM

CROSS-REFERENCE TO RELATED APPLICATION

This application claims the benefit of U.S. Provisional Application Ser. No. 61/850,498, filed Feb. 14, 2013, which application is incorporated herein by reference in its entirety.

BACKGROUND

The present invention relates to gravity filtration apparatus and in particular to a gravity water filtration system including an upper unfiltered water reservoir and a lower filtered water reservoir and further including an automatic fill assembly connected to a water supply source. The two reservoirs are at different elevations and are mated in an unsealed manner.

Typically, prior art water filtration devices consist of filter(s) having outer regions in working contact with the upper unfiltered water reservoir and the output core region of the filter is connected to the lower filtered water reservoir. A filter flange seal is installed between the upper reservoir and the filter output core to maintain fluid isolation between the upper and lower water reservoirs. These prior art water filtration devices, however, tend to allow an overflow condition of the filtered water between the mating surfaces of the two reservoirs during an overflow situation. This event may occur when excess supply water is contained in the system resulting in a spillover onto a counter or the like surface and waste of filtered water. Also, unfiltered water may be wasted, which may be equally significant to wasting filtered water during periods of dangerously low and limited water availability.

It is often difficult to operate available water filtration systems at the system's effective capacity. It may be noted that the fastest rate of water filter processing will occur as long as the top unfiltered water reservoir is full to the brim at all times. This condition is the design capacity, where design capacity is the maximum rate of output achieved under ideal conditions. The design capacity requires constant water flow rate through the system with the upper reservoir filled (input) to the brim at all times while the lower reservoir drains (output) at a flow rate equal to the upper reservoir fill rate.

Applicant's pending Non-Provisional patent application Ser. No. 13/942,852 filed Jul. 16, 2013, and Provisional Application No. 61/848,684 filed Jan. 9, 2013, which applications are incorporated herein by reference, disclose a gravity water filtration system enabling the operator to readily maintain optimum effective capacity (or 'optimum effective' maximum water weight) by observing the position of an indicator, a scale, or some portion of the system geometry. Once the water system weight is indicated at maximum, the operator may allow the system to achieve a steady state condition (equilibrium), where the filtered water level in the lower water reservoir will be at a maximum level, and the unfiltered water level in upper water reservoir will be at a minimum level. No water should be added to the upper water reservoir while the system water weight is at a maximum as spillover of filtered water will occur. As filtered water is drawn out of the lower reservoir, the indicated mass (water volume) is reduced accordingly, and supply water may be added into the system until the maximum system water weight is again achieved.

Maintaining optimum effective capacity (or maximum water weight) of available water filtration systems is difficult because such systems may contain only supply side upper primary filter(s), or alternatively they may contain upper primary filter(s) used in conjunction (in series) with lower secondary filter(s), all having different diameters, shapes, volumes, and filter saturation conditions thus making visual interpretation of system water weight virtually impossible.

SUMMARY

In a gravity filtration system, upper and lower fluid reservoirs may be mated together. Unfiltered fluid may be supplied to the upper reservoir. One or more filters provide fluid communication between the upper and lower fluid reservoirs. Fluid passes through the filter into the lower fluid reservoir. The weight of the fluid in the gravity filtration system may be monitored to maximize the fluid flow rate without loss of fluid by supporting the fluid reservoirs on a moveable platform interconnected to a stationary base by a force reactive linkage. Automatic fill components may be provided for automatically actuating a fluid supply valve connected to an unfiltered fluid source. As filtered fluid is withdrawn from the lower reservoir, actuation of the fluid supply valve to an open position permits unfiltered fluid to be supplied to the upper reservoir. Supply of unfiltered fluid to the upper reservoir is stopped upon actuation of the fluid supply valve to the closed position. Upon closure of the fluid supply valve, an equilibrium state in the filtration system will occur after sufficient time has elapsed for the upper fluid reservoir to drain and the filtered fluid level in the lower fluid reservoir no longer rises. Actuation of the fluid supply valve is a function of the weight of the fluid in the filtration system and/or vertical travel of the moveable platform. An indicator responsive to changes in the weight of the fluid in the filtration system may provide an indication of the equilibrium state of the filtered fluid in the lower fluid reservoir.

BRIEF DESCRIPTION OF THE DRAWINGS

So that the manner in which the above recited features, advantages and objects of the present invention are attained can be understood in detail, a more particular description of the invention briefly summarized above, may be had by reference to the embodiments thereof which are illustrated in the appended drawings.

It is noted, however, that the appended drawings illustrate only typical embodiments of this invention and are therefore not to be considered limiting of its scope, for the invention may admit to other equally effective embodiments.

FIG. 8B is a perspective view of the gravity filtration system shown in FIG. 8A depicting the filtration system in a near empty condition;

DETAILED DESCRIPTION OF PREFERRED EMBODIMENTS

Figure 1:
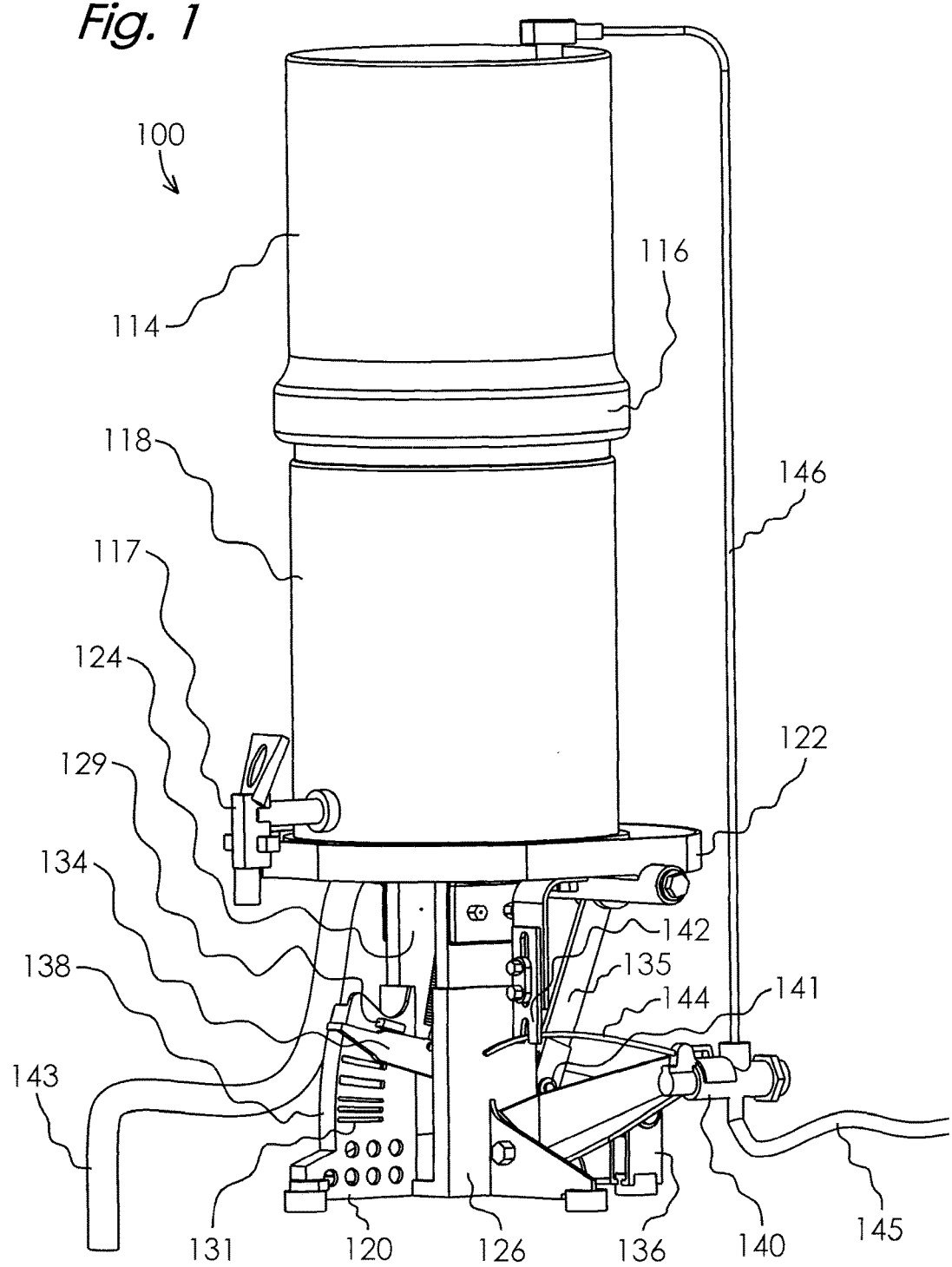
FIG. 1 is a front perspective view of a first embodiment of a gravity filtration system.
Figure 2:
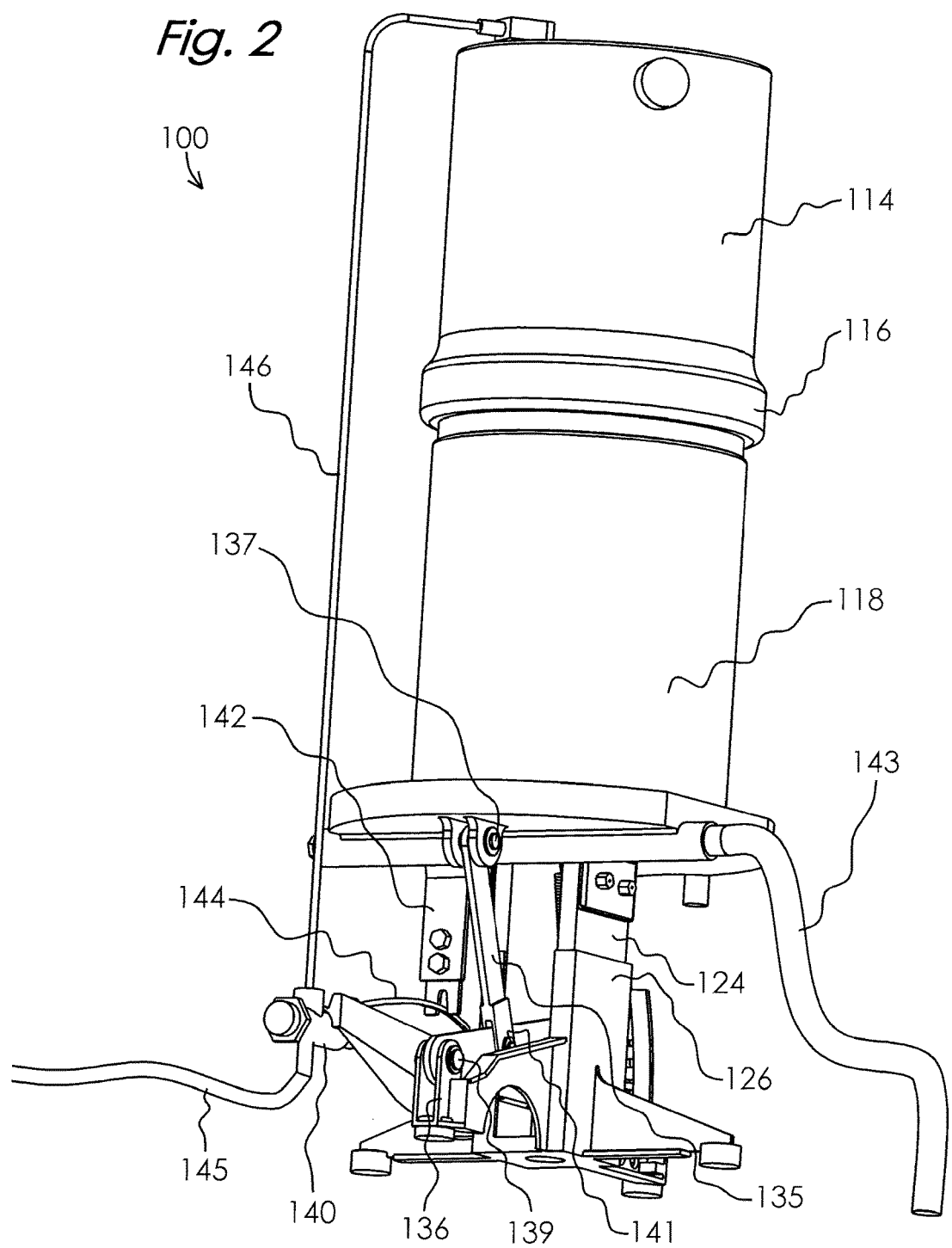
FIG. 2 is a rear perspective view of the gravity filtration system shown in FIG. 1.
Figure 3:
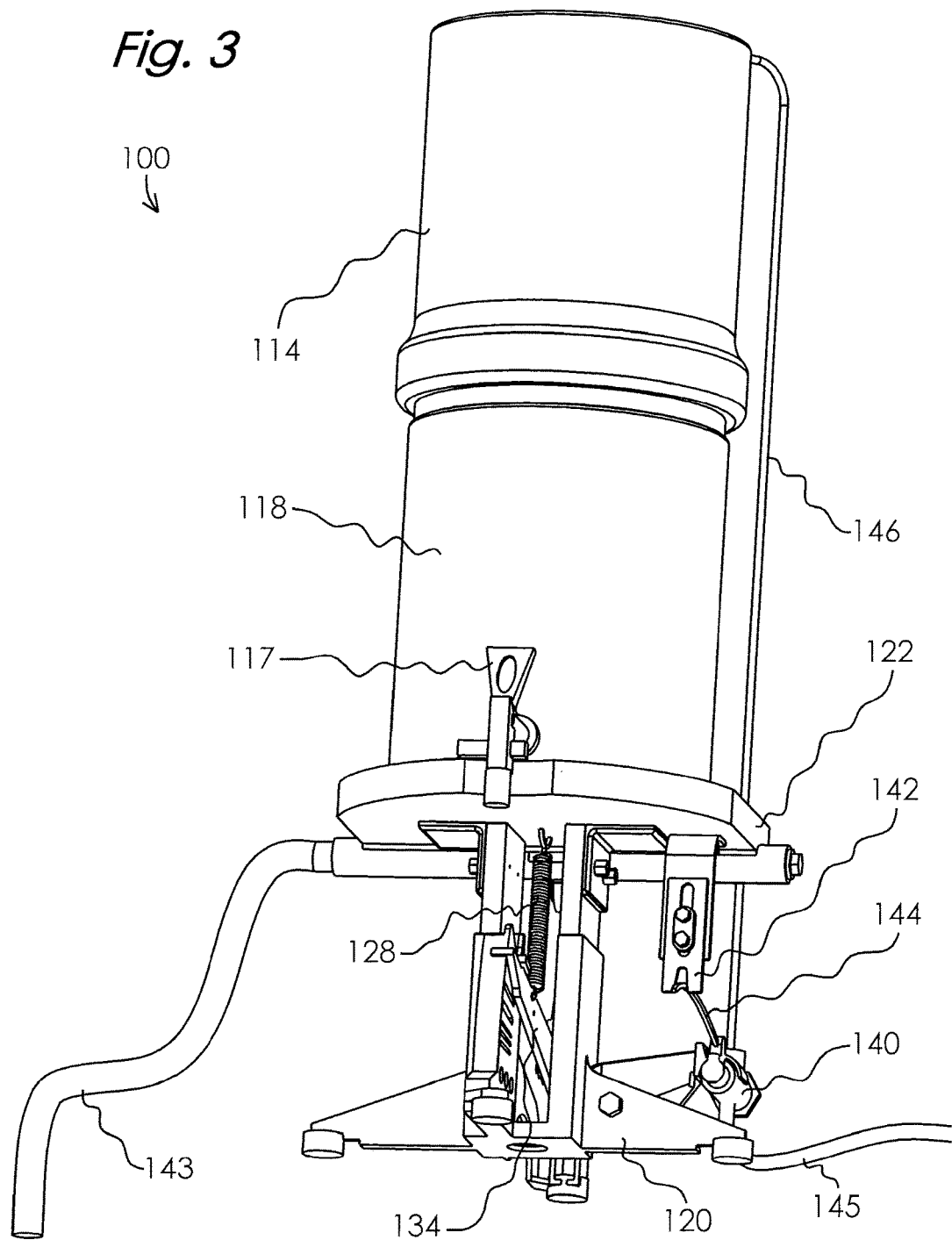
FIG. 3 is a front perspective view of the gravity filtration system shown in FIG. 1.

In the drawings and description that follows, like parts are marked throughout the specification and drawings with the same reference numerals. The drawing figures are not necessarily to scale. Certain features may be shown exaggerated in scale or in somewhat schematic form and some details of conventional elements may not be shown in the interest of clarity and conciseness. The invention is subject to embodiments of different forms. Specific embodiments directed to gravity water filtration systems are described in detail herein and are shown in the drawings, with the understanding that the disclosure is to be considered an exemplification of the principles of the invention, and is not intended to limit the invention to the illustrated and described embodiments. The different teachings of the embodiments discussed below may be employed with other fluids or separately or in any suitable combination to produce desired results. The terms "connect," "engage," "couple," "attach," or any other term describing an interaction between elements is not meant to limit the interaction to direct interaction between the elements and may also include indirect interaction between the elements described. The various characteristics mentioned above, as well as other features and characteristics described in more detail below, will be readily apparent to those skilled in the art upon reading the following detailed description of the embodiments, and by referring to the accompanying drawings.

Directing attention now to the figures, a first embodiment of a gravity filtration system generally identified by the reference numeral 100 is shown in FIG. 1. The filtration system 100 may include an upper fluid reservoir 114 and a lower fluid reservoir 118 mated together in an unsealed manner. In the specific embodiments described herein unfiltered water may be supplied to the upper fluid reservoir 114 and filtered water is discharged into the lower reservoir 118. The water reservoirs 114, 118 are depicted as having a cylindrical shape for illustrative purposes. It is understood however that the water reservoirs 114, 118 are not limited to any particular shape or size. A circumferential flange 116 fixed about the lower region of the upper reservoir 114 may be sized and configured to provide a friction fit with the upper outer region of the lower reservoir 118 when the water reservoirs 114, 118 are mated together as shown in FIG. 1. The friction fit, however, is not water tight and filtered water from the lower reservoir 118 may overflow onto a supporting surface, such as a counter or table, when excess water is contained in the system.

Figure 4:
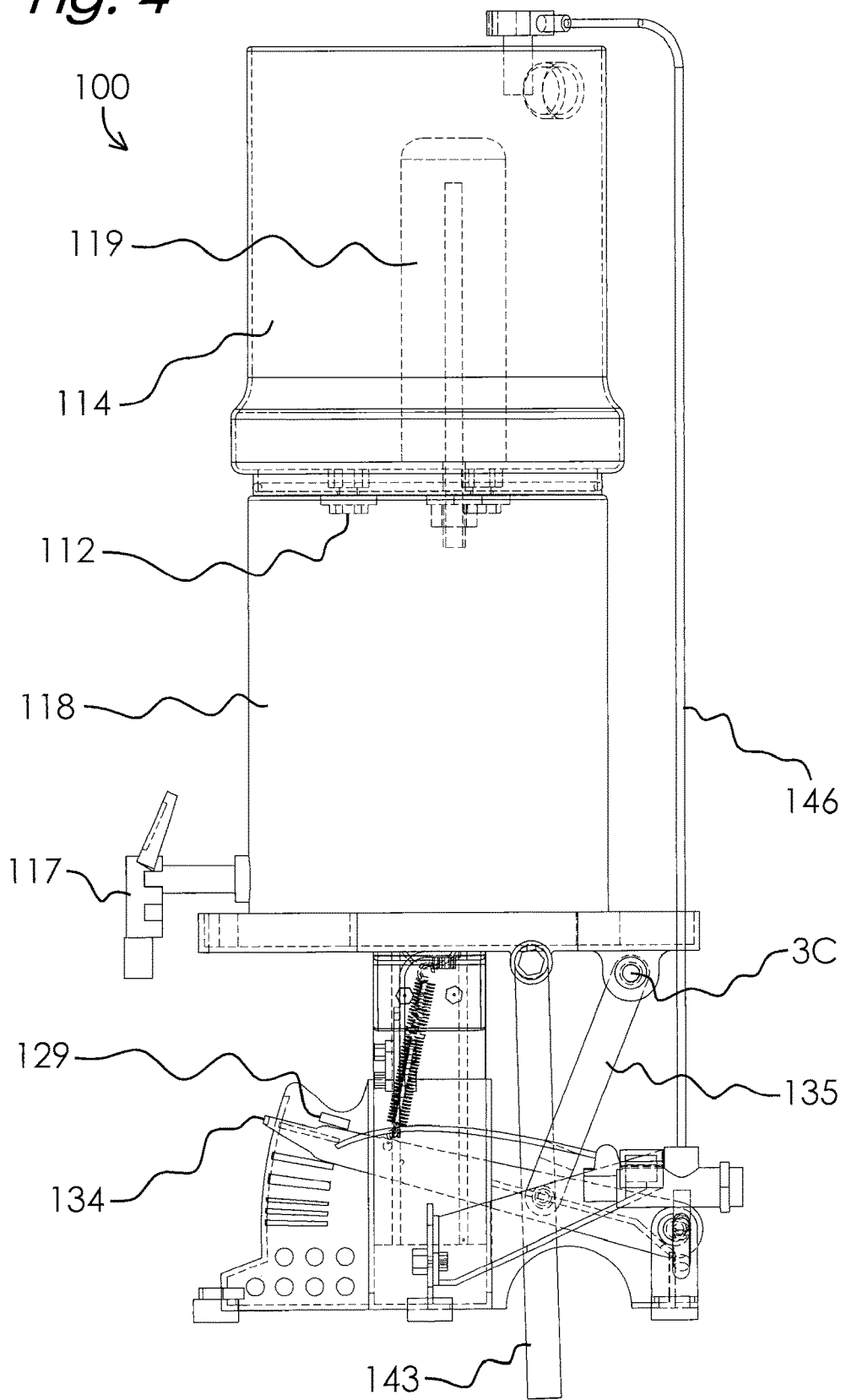
FIG. 4 is a side view of the gravity filtration system shown in FIG. 1 with some elements shown in phantom.
Figure 5:
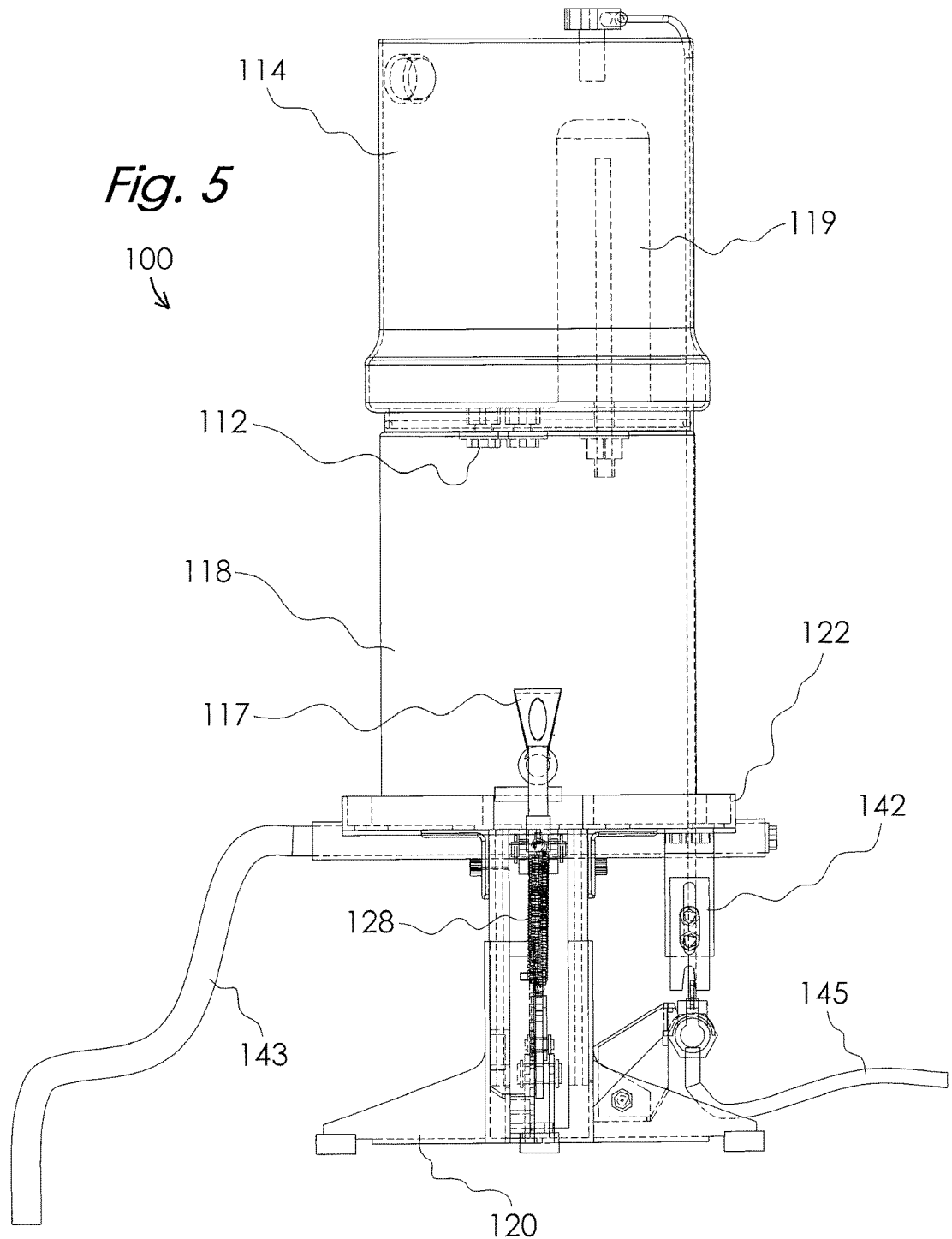
FIG. 5 is a front elevation view of the gravity filtration system of FIG. 1 with some elements shown in phantom.
Figure 6:
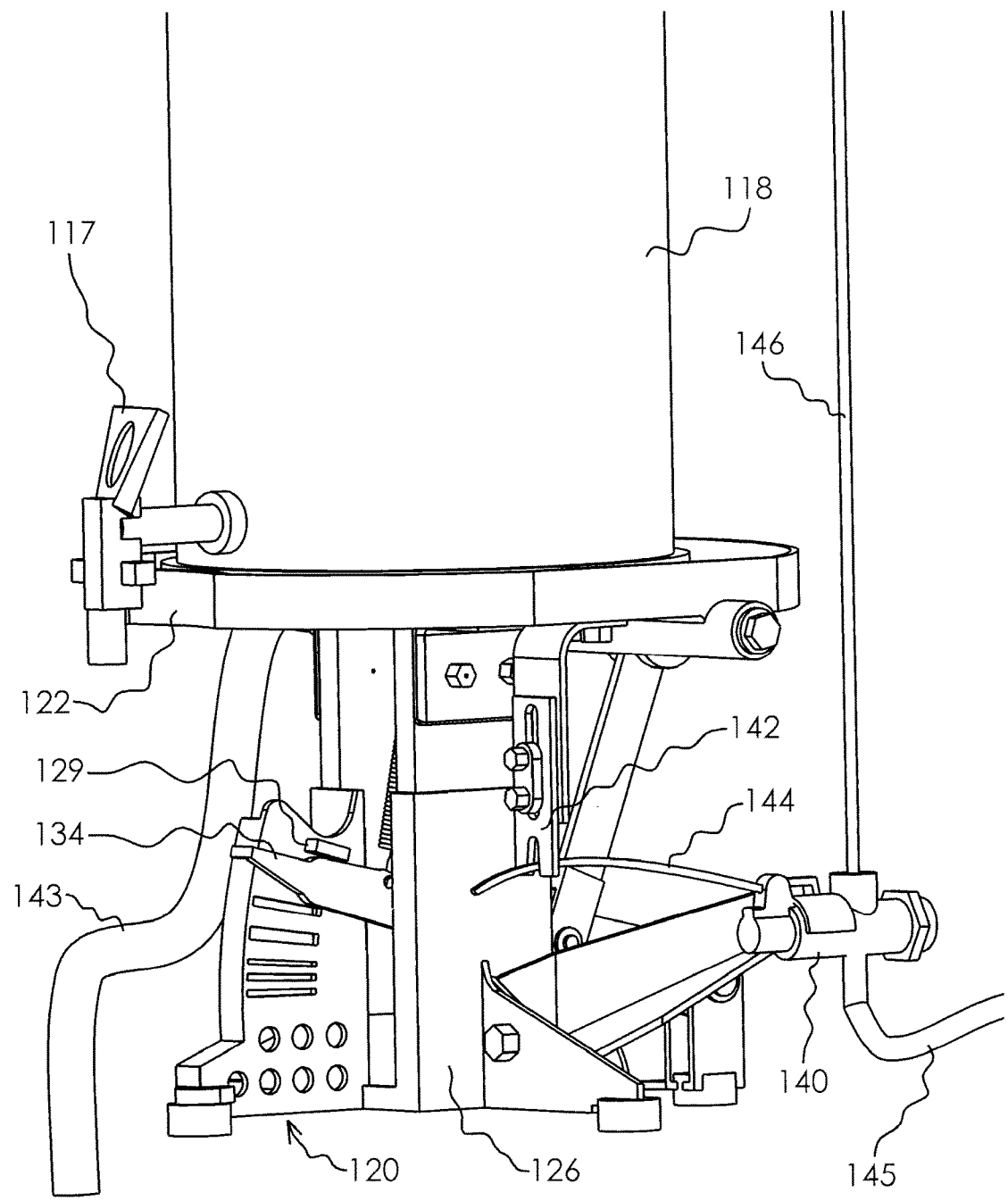
FIG. 6 is an enlarged partial perspective view of the lower portion of the gravity filtration system shown in FIG. 1.

The upper reservoir 114 shown in FIG. 1 may house a filter 119, shown in phantom in FIG. 4. The filter 119 includes an end sized for engagement in a known manner with a hole in the bottom of the upper reservoir 114. Typically, more than one hole may be provided in the bottom of the upper reservoir 114 in order to accommodate more than one filter 119. Any unused holes may be plugged by a plug 112 to maintain fluid isolation between the upper and lower reservoirs 114 and 118, respectively. Filtered water may be dispensed from the lower reservoir 118 through a spout 117 located proximate the bottom region of the lower reservoir 118.

The outer surface of the filter 119 may be exposed to unfiltered water supplied to the upper reservoir 114. The inner core region of the filter 119 is in fluid communication with the lower water reservoir 118. Unfiltered water may pass through the filter 119 and discharged into the lower reservoir 118 as filtered water suitable for drinking, cooking and other uses.

As noted above, the design capacity of a gravity water filtration system requires constant water flow rate through the system with the upper reservoir filled to the brim at all times while the lower reservoir drains at a flow rate equal to the fill rate. The water filtration system 100 may be operated at an effective capacity, where the effective capacity is less than design capacity. The effective capacity occurs at a predetermined value of the weight of the "system water." When operating at its effective capacity, the filtration system 100 may perform at a significantly high flow rate without loss of water. During periods of inactivity, the filtration system 100 may achieve steady state or equilibrium.

Referring still to FIG. 1, the water filtration system 100 includes a base 120 designed to rest upon a substantially flat surface, such as a counter or table or the like. A generally vertically movable platform 122 is supported above the base 120 on a telescoping column comprising a downwardly extending platform telescopic member 124 fixed to the bottom of the platform 122 that is in telescopic engagement with an upwardly extending base telescopic member 126 fixed to the base 120.

Continuing with FIG. 1, it will be observed that the platform 122 moves vertically as a function of the weight of the water in the upper and lower reservoirs 114, 118 of the filtration system 100. Platform telescopic member 124 moves linearly in a constrained manner relative to base telescopic member 126 as the weight of the water in the filtration system 100 varies. A fill level indicator 134 and a graduated scale 138 may provide a visual indication of the water fill level in the filtration system 100. The indicator 134 may be rotatably connected to a bracket 136 mounted on the base 120. An end of the indicator 134 may be pivotally connected to the bracket 136 at shaft 139. A coupler link 135 may connect the indicator arm 134 to the movable platform 122. An upper distal end of the coupler link 135 may be rotatably connected to the movable platform 122 at pin 137 while a lower distal end of the coupler link 135 may be rotatably connected to the indicator arm 134 at pin 141. The indicator 134 may move proximate the scale 138 or the like mounted on the base 120 to indicate the water fill level in the filtration system 100. The indicator 134 may move proportionally (and/or functionally "f(x)," and/or logrithimically) as a function of the weight of the water in the filtration system 100.

An extension spring 128 may have an upper end connected the platform 122 and a lower end connected to the fill level indicator 134. The extension spring 128 cooperates with the linkage arrangement between the coupler link 135 and the fill level indicator 134 such that as platform 122 moves down with added water weight, the extension spring 128 increases in length.

The platform telescopic member 124 and base telescopic member 126 may be fabricated of dissimilar materials. For example, telescopic member 124 may be UHMW and telescopic member 126 may be steel. In order to prevent separation between the base 120 and platform 122 at relatively low water system weights, a stop 129 may be provided to limit the upward travel of the platform 122. The stop 129 may be secured to the scale 138. As the platform 122 moves upwardly with a reduction in system water weight, the fill level indicator 134 rotates upwardly about the shaft 139. Upon engagement of the fill level indicator 134 with the stop 129, further upward travel of the platform 122 is stopped. Indicia 131 may be provided on the scale 138 to enable an operator to estimate water system weight, although because the system has automatic filling capabilities, such information may be considered extraneous and is merely provided to the operator to indicate that the system is operating normally with pressurized supply water, and being maintained at a regulated, optimum, and relatively constant water system weight.

The automatic fill components of the filtration system 100 may include a water supply valve 140, an actuator link 142 and a control arm 144. The valve 140 may be secured to the base 120 and the actuator link 142 may be secured to the platform 122. The control arm 144 may be connected to the valve 140 in such a manner that upon engagement of the control arm 144 with the actuator link 142, the valve 140 is opened permitting unfiltered water to flow through a water supply line 146 into the upper reservoir 114 of the filtration system 100. The water supply line 146 may be connected to an outlet port of the valve 140 at one end and the open distal end thereof secured to the top of the upper reservoir 114. One end of the control arm 144 is fixedly secured to the valve 140 and the opposite distal end thereof is in contact with the actuator link 142. Depending on the rate of withdrawal of water from the lower reservoir 118, the flow rate of unfiltered water into the upper reservoir 114 may vary over a range where the valve 140 is fully open to fully closed.

The automatic fill components of the filtration system 100 may be arranged in configurations other than as shown in FIG. 1. For example, if the water supply line 145 connecting the valve 140 to the water source is flexible (as opposed to a non-flexible water supply line 145), the valve 140 may be secured to the platform 122, and the actuator link 142 may be secured to the base 120. In any event, the relative movement between the base 120 and the platform 122 which occurs as a function of the system water weight generally controls the water flow through valve 140.

The upper reservoir supply line 146 of the filtration system 100 may be at atmospheric pressure and may be generally flexible. The supply line 146 may be constructed, for example, of polyethylene or some other suitable plastic. However, it may be further noted that supply line 146 may be rigid, as for example in the shape of an inverted hollow cane and constructed of glass or metal, and may not contact the upper reservoir 114. In such instance, the rigid supply line may be threaded to the valve 140 or otherwise supported by the valve 140 so that it extends upwardly from the valve 140 generally vertically and substantially parallel to the stacked upper and lower reservoirs 114, 118.

As water is drawn out of the lower reservoir 118 through the spigot 117, the weight of the water in the filtration system 100 will be reduced accordingly. As the platform 122 moves upward, the control arm 144 moves upward and opens the water supply valve 140 thereby supplying unfiltered water to the upper reservoir 114. Equilibrium of the filtration system 100 is established when a balance occurs between water demand and water supply.

A drain hose 143 may be connected to the platform 122. Although the drain hose 143 is not critical to the function of the filtration system 100, it may be optionally installed to prevent water damage to indoor surfaces, such as a counter or the like, in the event of a valve malfunction (valve leaking). The drain hose 143 may be 1 mil plastic, or flexible waterproof canvas, for example, and collapse flat during normal operation.

The filtration system 100 may be automatically operated at its design capacity where the fastest rate of processing filtered water occurs when the upper reservoir 114 is full to the brim at all times. The design capacity is the maximum water output rate under optimum conditions. The filtration system 100 may be operated at design capacity by maintaining constant water flow through the filtration system 100 so that the upper reservoir 114 may be nearly full at all times while the lower reservoir 114 is nearly empty at all times. The design capacity of the filtration system 100 may be attained by opening the spigot 117 and keeping the lower reservoir 118 generally empty. The control arm 144 may be adjusted to throttle the water flow through the supply valve 140 to maintain the upper reservoir 114 nearly full during the filtering process.

Figure 7:
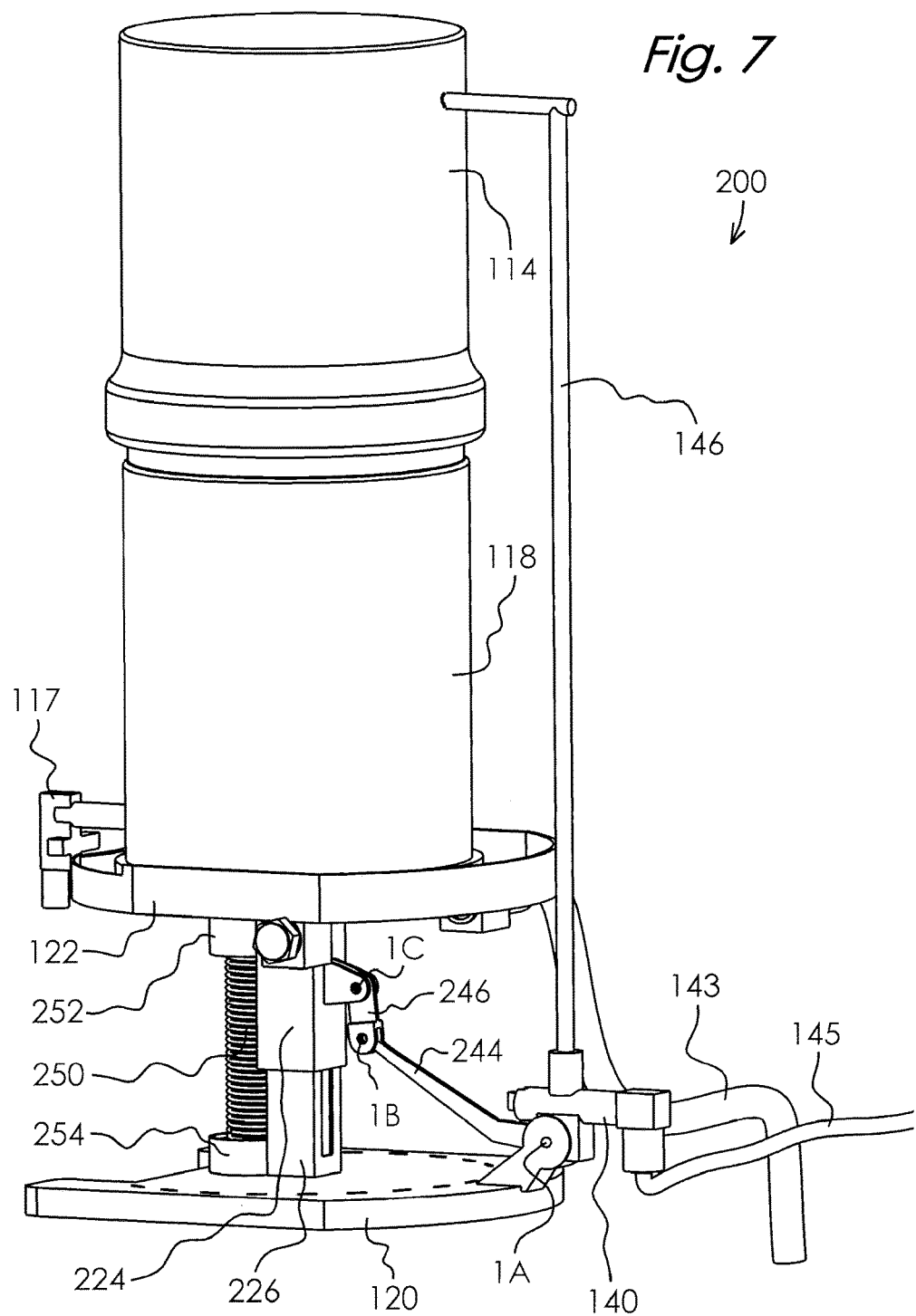
FIG. 7 is a side perspective view of a second embodiment of a gravity filtration system.

Referring now to FIG. 7, a second embodiment of a gravity filtration system is generally identified by the reference numeral 200. As suggested by the common reference numerals, the filtration system 200 is similar to filtration system 100, except for the compression spring 250, the control arm 244 and the manner in which the control arm 244 is connected to the platform 122 to open and close the supply valve 140. The compression spring 250 may be positioned between the base 120 and platform 122. Engagement of the upper end of the compression spring 250 with the bottom of the platform 122 may be maintained by a spring retention collar 252 secured to the bottom of the platform 122 and engagement of the lower end of the compression spring 250 with the base 120 may be maintained by a spring retention collar 254 secured to the base 120.

The platform 122 telescopes relative to the base 120 at respectively connected telescopic members 224 and 226. The compression spring 250 biases the platform 122 upward relative to base 120 thereby providing a reactive force to the downward movement of the platform 122. The valve control arm 244 may be rotatably secured to the base 120 at axis 1A. The connector link 246 may be rotatably connected to the control arm 244 at axis 1B, and the opposite end of the connector link 246 may be rotatably connected to the platform telescopic member 224 at axis 1C. Supply valve 140 may be secured to the base 120 as described above with reference to the filtration system 100. Different valve styles however, such as valves having vertically orientated seat/piston axes, may be secured in different configurations or orientations for proper operation of the valve and/or manufacturing requirements.

Referring still to FIG. 7, as water is drawn out of the lower reservoir 118 through the spigot 117, the weight of the water in the filtration system 200 is reduced accordingly. As the reservoirs 114, 118 move upward, the control arm 244 rotates about axis 1A and opens the supply valve 140, thereby supplying water to the upper reservoir 114. As the weight of the water in the filtration system 200 increases, the reservoirs 114, 118 move downward until the maximum water weight for the filtration system 200 is reached and the water supply valve 140 is closed. Equilibrium of the filtration system 200 is established when a balance occurs between water demand and water supply.

Figure 8A:
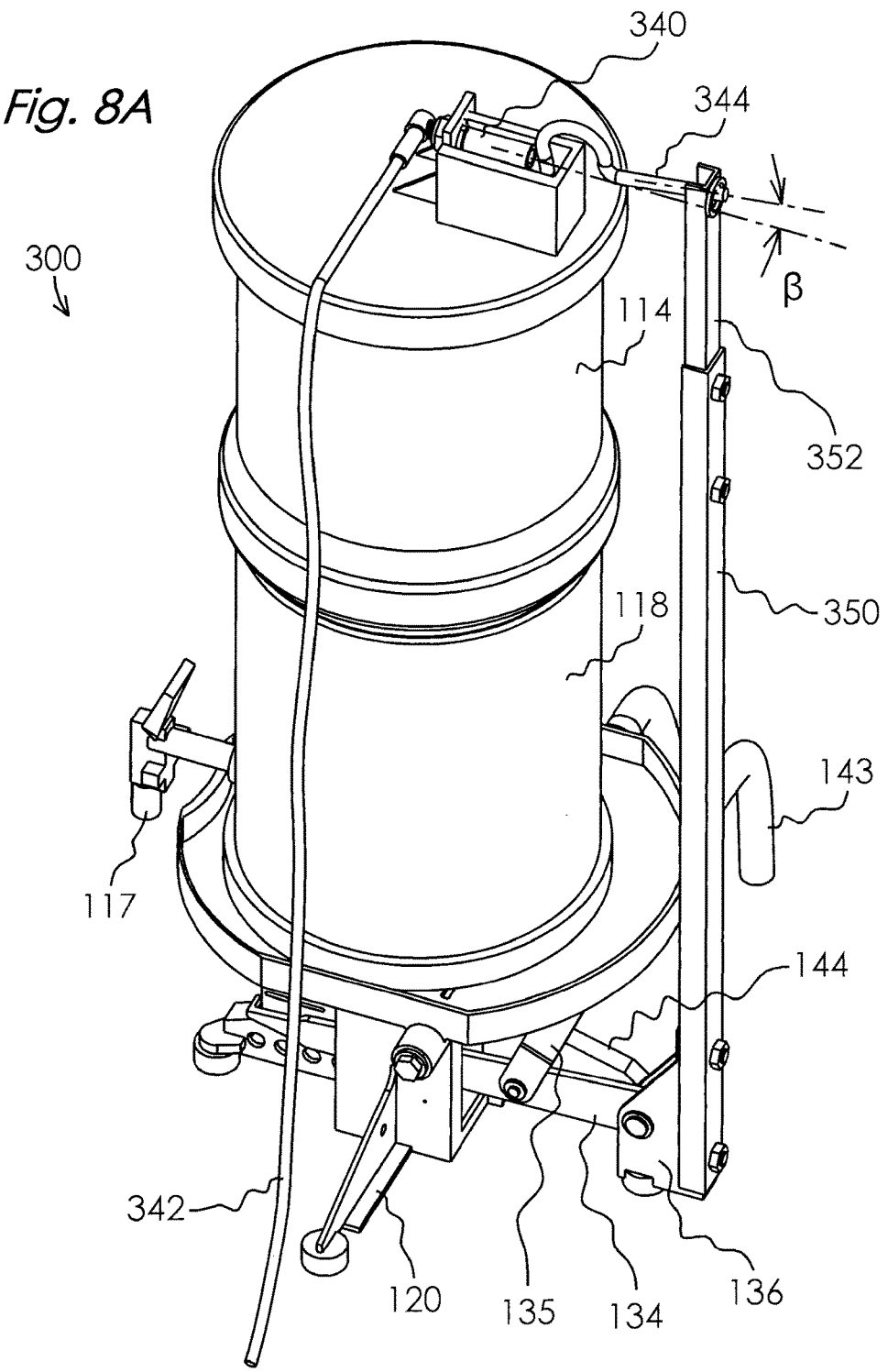
FIG. 8A is a perspective view of a third embodiment of a gravity filtration system depicting the filtration system in a near full condition.

Referring now to FIGS. 8A and 8B, a third embodiment of a gravity filtration system is generally identified by the reference numeral 300. As suggested by the common reference numerals, the filtration system 300 is similar to filtration system 100, except for the location of the water supply valve 340, the control arm 344 and the manner in which the control arm 344 is actuated to open and close the supply valve 340. In the filtration system 300, the water supply valve 340 may be secured to the lid or top 341 of the upper reservoir 114. A stanchion 350 is secured to the base 120 at bracket 136. The stanchion 350 extends generally vertically upward from the base 120 spaced from and substantially parallel to the stacked upper and lower reservoirs 114, 118. A stanchion extension member 352 may be secured to the upper end of the stanchion 350. Bolts 354 or the like secure the extension member 352 to the stanchion 350. The control arm 344 is disposed between and rotatably connected to the extension member 352 and the supply valve 340. The extension member 352 may be adjustable relative to the stanchion 350 to align the control arm 344 with the water supply valve 340. The linkage of the control arm 344 with the water supply valve 340 may be configured to permit the control arm 344 to move through a range of rotation so that the water supply valve 340 is opened when the water mass of the filtration system 300 drops to approximately ninety percent of optimum or full capacity. The range of rotation of the control arm 344 may be only a few degrees, shown as angles "α" and "β" in FIGS. 8A and 8B. The angles α and β may be defined by the axis of the distal end of the control arm 344 and deviate oppositely from a horizontal plane passing through the distal end of the control arm 344. A water supply line 342 may have one end connected to the inlet side of the water supply valve 340 and the opposite end of the line 342 connected to a water source. The line 342 may have a relatively small diameter. For example, the diameter of the line 342 may be about the same as the water supply line used in drip irrigation or the water supply line for ice makers, and constructed of flexible material such as polyethylene. The water supply line 342 may be connected to a water source, such as an adjacent faucet or water valve, or to a line leading to an ice maker, for example. The drain line 143 may be directed toward a sink, or may be plumbed directly to a household drain system.

Figure 9:
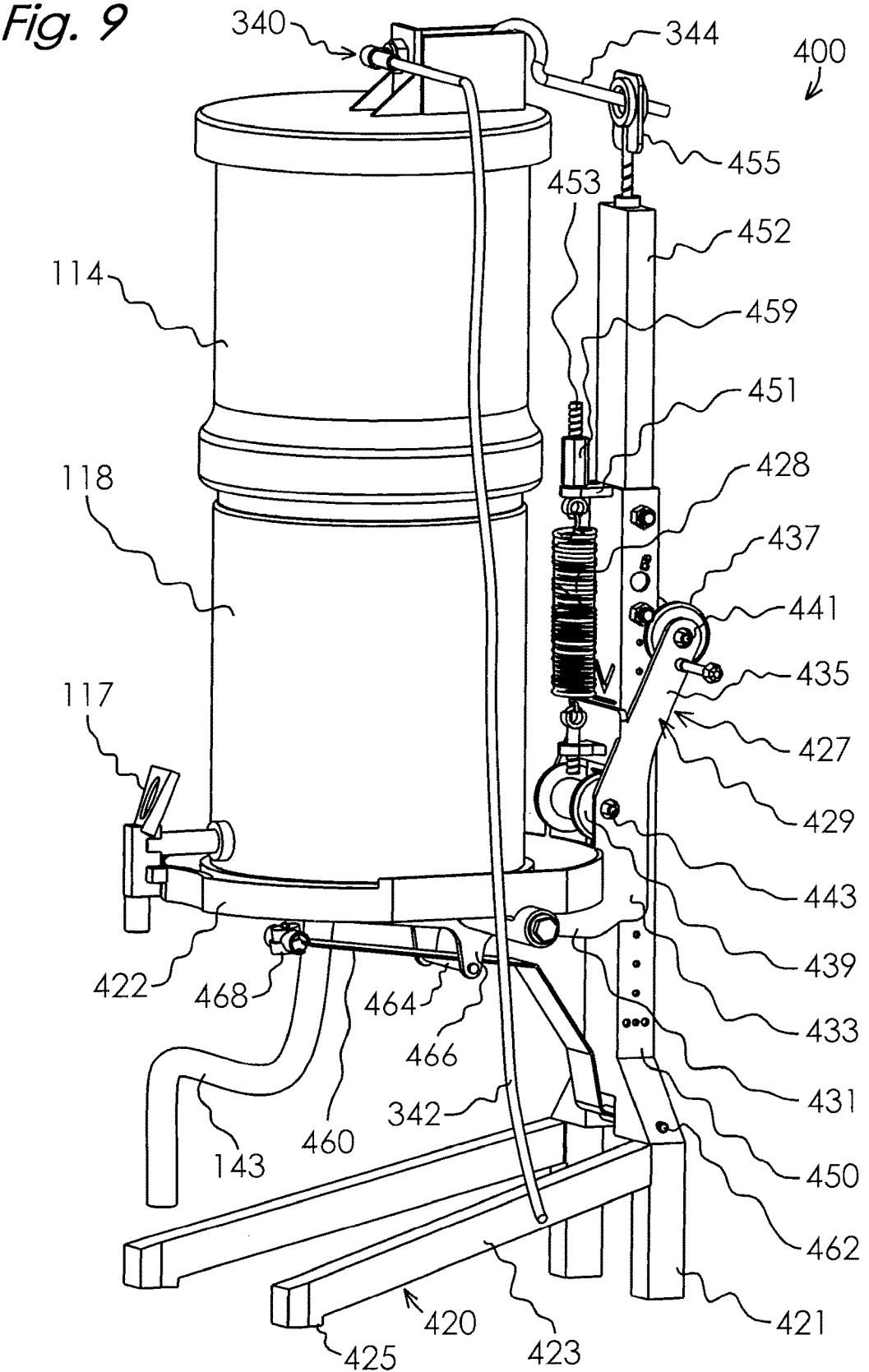
FIG. 9 is a perspective view of a fourth embodiment of a gravity filtration system.
Figure 10:
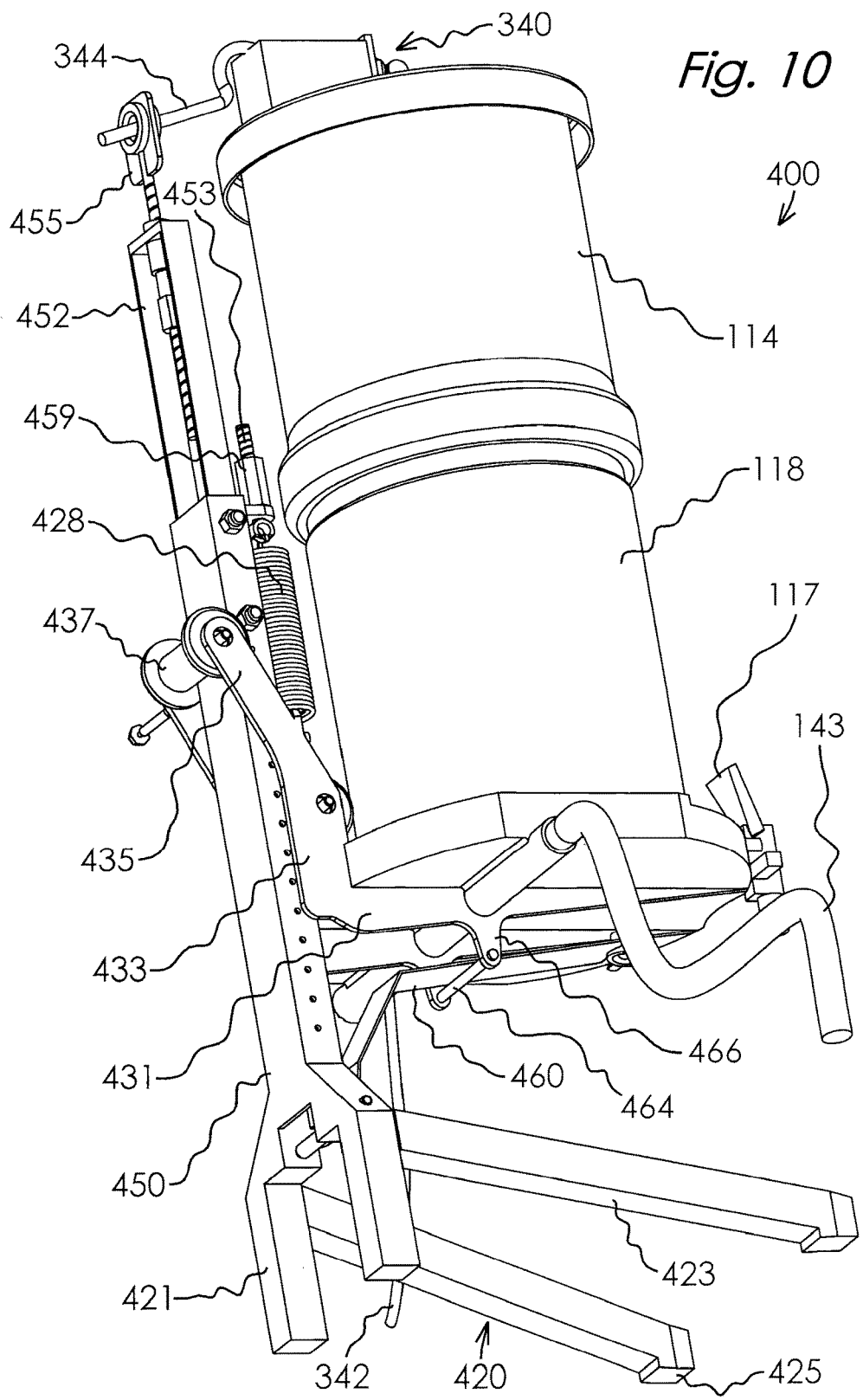
FIG. 10 is another perspective view of the gravity filtration system shown in FIG. 9.
Figure 11:
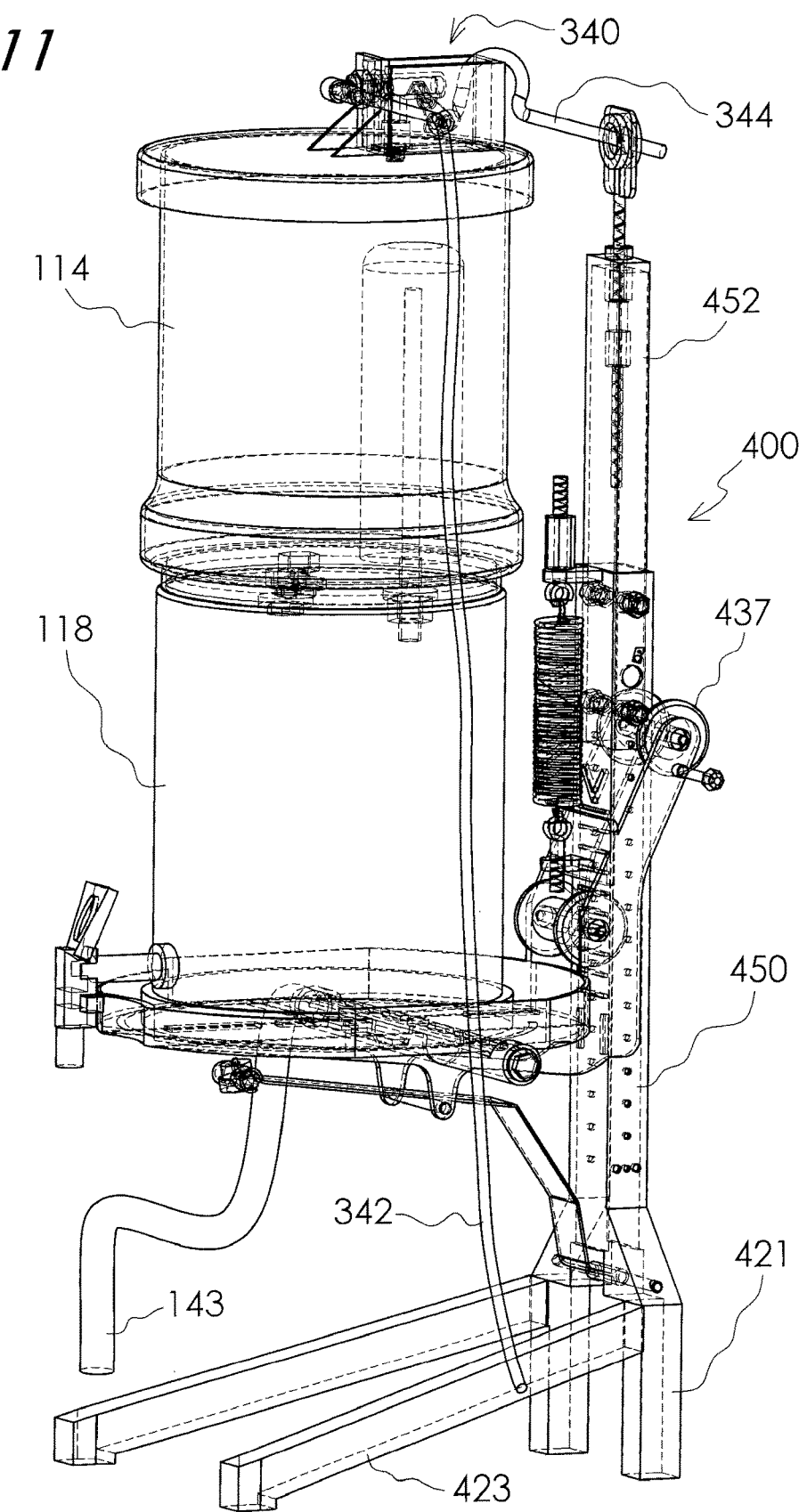
FIG. 11 is a perspective view of the gravity filtration system shown in FIG. 9 with some elements shown in phantom.

Referring now to FIGS. 9-11, a fourth embodiment of a gravity filtration system is generally identified by the reference numeral 400. As suggested by the common reference numerals, the filtration system 400 is similar to filtration system 300, except for the configuration of the base and the automatic fill components. The base 420 may include a pair of generally vertically extending legs 421. An elongated beam 423 is fixedly secured to each leg 421 proximate the upper end thereof and extends at an angle and downward from the leg 421 forming a generally L-shaped profile. The angle formed by the leg 421 and the beam 423 is less than ninety degrees. Each beam 423 may include a foot pad 425 at the distal end thereof. The foot pad 425 may be integrally formed with the beam 423 or alternatively as a separate component and secured to the beam 423. The foot pad 425 includes a substantially horizontal planar face designed to rest upon a substantially flat surface, such as a counter or table or the like.

A stanchion 450 may be fixedly secured to the upper ends of the legs 421. The legs 421, beams 423 and stanchion 450 form a stable structure for supporting the platform 422 above the base 420. The stanchion 450 is fixed to the legs 421 and extends generally vertically upward from the legs 421.

A carriage 427 may be movably mounted on the stanchion 450. The carriage 427 includes sidewalls 429 that are secured to the platform 422. The sidewalls 429 may include a substantially horizontal lower portion 431 extending below and secured to the bottom of the platform 422. An intermediate portion 433 of the sidewalls 429 extends vertically upward and an upper portion 435 extends angularly upwardly. An upper roller 437 and a lower roller 439 are rotatably secured between the sidewalls 429 at shafts 441 and 443, respectively. The rollers 437 and 439 engage and travel along the stanchion 450. The carriage 427 is constrained by the rollers 437 and 439 to travels linearly up and down the stanchion 450. The platform 422, being fixed to the carriage 427, likewise travels linearly relative to the stanchion 450.

An extension spring 428 may have an upper end connected to the stanchion 450 at a tab 451 projecting outwardly from the stanchion 450. The lower end of the extension spring 428 may be connected to a transverse plate 430 disposed between and secured at the opposite ends thereof to the sidewalls 429 of the carriage 427. A shaft 453 connected to the upper end of the extension spring 428 extends through a hole in the tab 451. A turning nut 459 may be threaded on a threaded portion of the shaft 453. The tension in the extension spring 428 may be controlled by adjusting the position of the turning nut 459 on the shaft 453 in order to establish the spring force (tension) exerted by the extension spring 428 between the base 420 and the platform 422.

A stanchion extension member 452 may be secured to the upper end of the stanchion 450. Bolts 454 or the like secure the extension member 452 to the stanchion 450. An adjustable connector 455 may be threaded to the upper end of the extension member 452. The control arm 344 is connected between the water supply valve 340 and the connector 455 in the manner described above with reference to filtration system 300.

An optional visual indicator 460 may be provided to visually indicate the vertical displacement of the platform 422. The indicator 460 may be rotataby secured to the base 420 at shaft 462. A distal portion of the indicator 460 is supported by a transverse pin 464 mounted between lobes 466 extending downward from lower portion 431 of the sidewalls 429 of the carriage 427. An LED 468 or other light source may be installed at the distal end of the indicator 460 to further enhance the visual tool and to also provide a limited amount of night time illumination.

Figure 12:
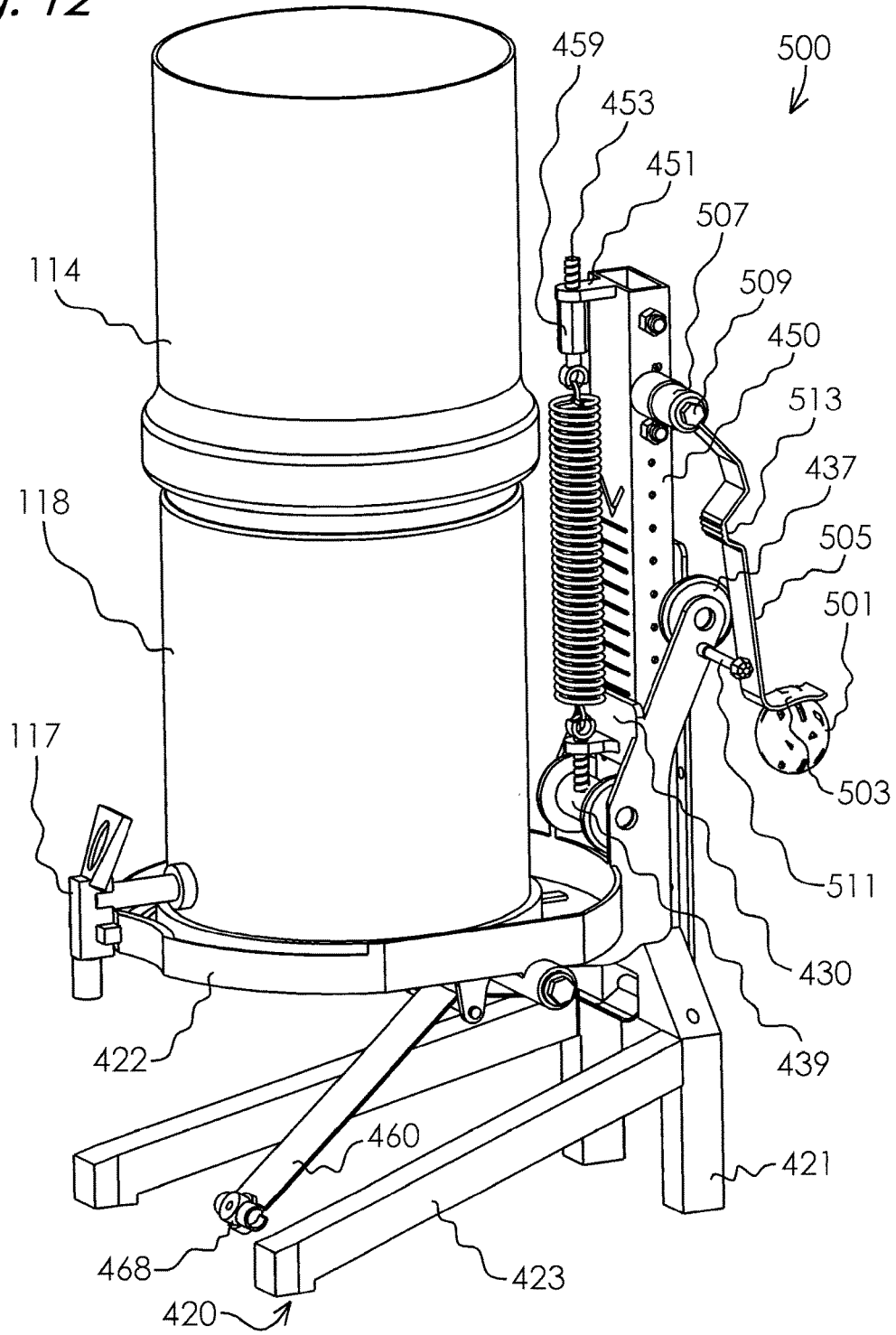
FIG. 12 is a perspective view of a fifth embodiment of a gravity filtration system depicting the filtration system in a near full condition.
Figure 13:
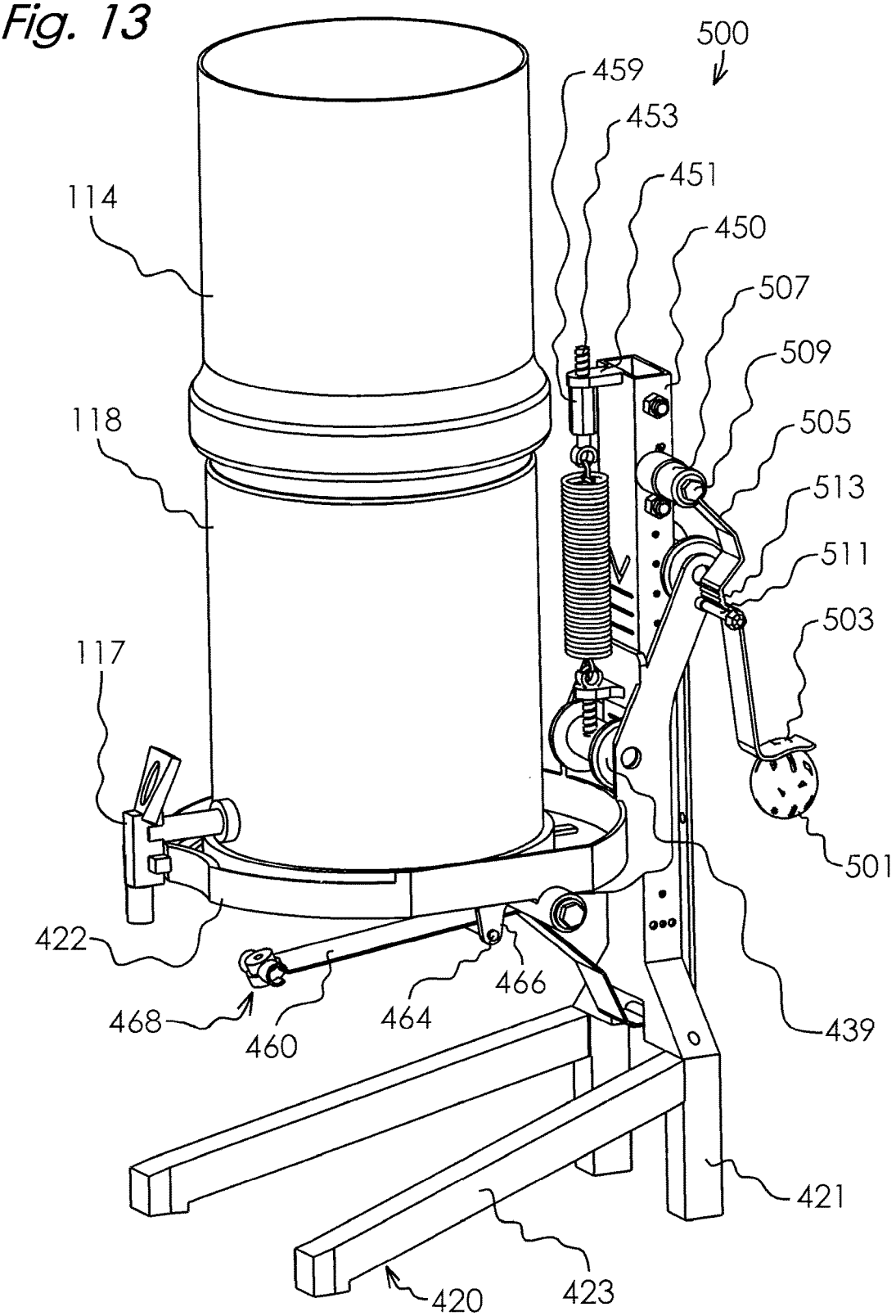
FIG. 13 is a perspective view of the gravity filtration system shown in FIG. 12 depicting the filtration system in a near empty condition.

Referring now to FIGS. 12 and 13, a fifth embodiment of a gravity filtration system is generally identified by the reference numeral 500. As suggested by the common reference numerals, the filtration system 500 is similar to filtration system 400, except that the filtration system 500 is configured for manual operation. The filtration system 500 does not include the automatic fill components that may be automatically actuated to supply water to the upper reservoir 114. The filtration system 500 may include an audio component to signal the operator to add water to the upper reservoir 114. The audio component may be a bell 501 or the like fixed to the distal end 503 of a leaf support 505. The proximal end 507 of the leaf support 505 is pivotally connected to the stanchion 450 at shaft 509. The leaf support 505 movably engages a pin 511 fixed to a sidewall 429 of the carriage 427. The leaf support 505 includes a fold or crimp 513 near its proximal end 507. As water is dispensed from the lower reservoir 118, the pin 511 slides along the leaf support 505 and upon engaging the crimp 513 causes the leaf support to swing so that the bell 501 emits an audible signal indicating that water should be added to the upper reservoir 114. In FIG. 12, the filtration system 500 is illustrated in a near full condition and FIG. 13 illustrates the filtration system in a near empty condition and depicting the pin 511 engaging the crimp 513 in the leaf support 505.

Figure 14:
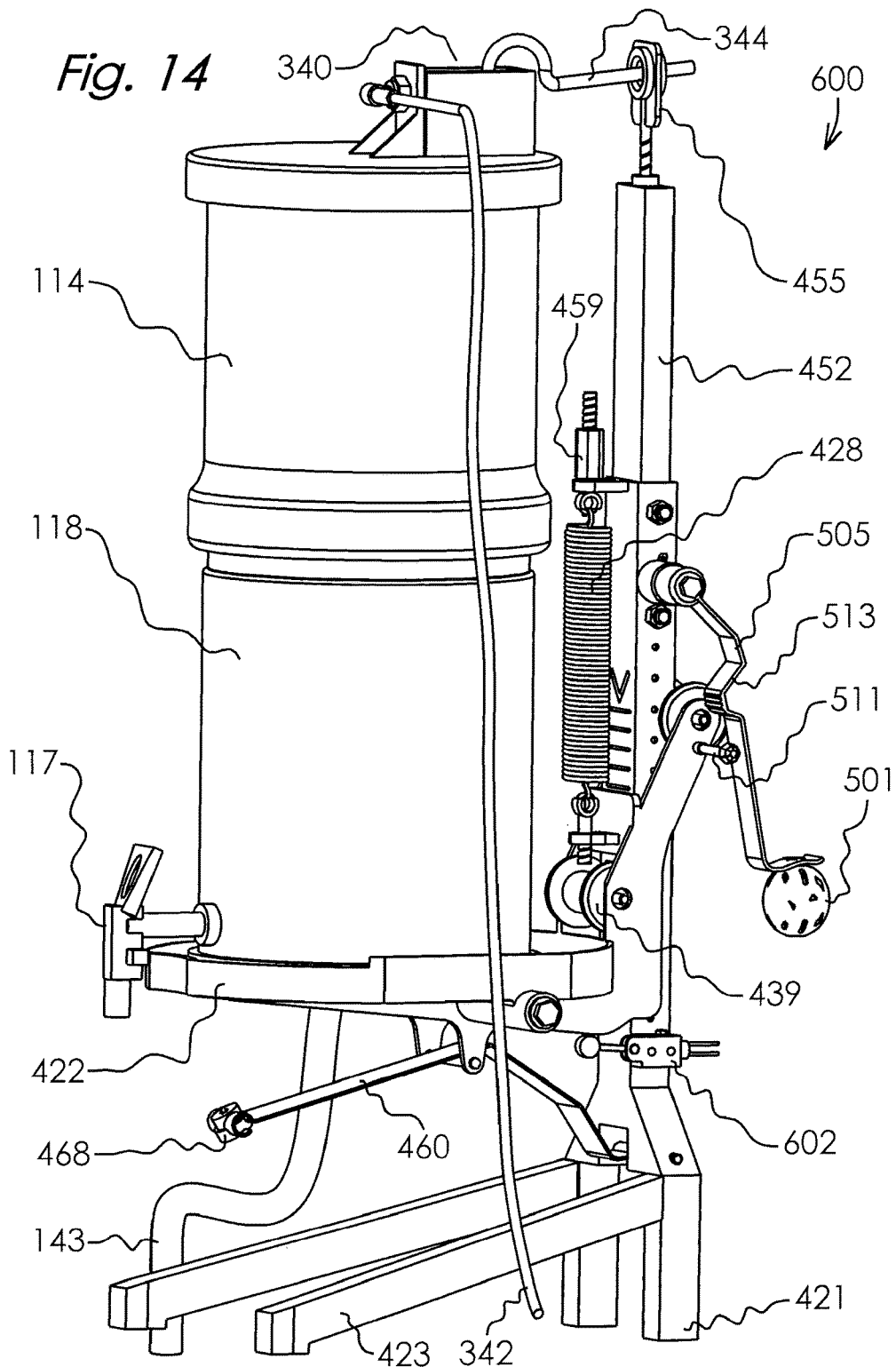
FIG. 14 is a perspective view of a sixth embodiment of a gravity filtration system.

Referring now to FIG. 14, a sixth embodiment of a gravity filtration system is generally identified by the reference numeral 600. As suggested by the common reference numerals, the filtration system 600 is similar to filtration systems 400 and 500, except that the filtration system 600 includes the automatic fill components and a micro switch for actuating a motorized valve at the water supply source. It will be observed that the filtration system 600 includes the audio components described above to illustrate that both audio and visual features may be included in an automatic fill configuration of a gravity filtration system, if desired. The automatic fill configurations of the filtration systems described herein, however, would not typically include both audio and visual indicators and may not include any position indicators.

The filtration system 600 may include a micro switch 602 mounted on the stanchion 350. The micro switch 602 is electrically connected to a main valve at the water source. In the event of a malfunction of the water supply valve 340, where excess water may be supplied to the water reservoir 114, the platform 422 engages the micro switch 602 which actuates the main valve to shut off the supply of water to the water supply valve 340.

The input line pressure for the filtration systems described above may be relatively low for the systems to operate normally. For example, the differential pressure between the water supply line 145 and the atmosphere may be about one pound per square inch (1 psi), thus enabling an operator to use rain barrels or the like as a water source, where the water level within such barrels is about a foot or so above the upper reservoir 114.

While various embodiments of a gravity water filtration system have been shown and described herein, other and further embodiments may be devised without departing from the basic scope thereof, and the scope thereof is determined by the claims which follow.

The invention claimed is:

1. A gravity filtration system, comprising:
a) a base;
b) a moveable platform supported above said base;
c) an upper fluid reservoir and a lower fluid reservoir supported on said platform in separable substantially vertical alignment, a lower end of said upper fluid reservoir in unsealed mating engagement with an upper end of said lower fluid reservoir, and wherein said upper fluid reservoir is in fluid communication with said lower fluid reservoir;
d) a force reactive linkage interconnecting said platform to said base;
e) a fluid supply valve operatively connected between an unfiltered fluid source and said upper fluid reservoir, wherein said fluid supply valve is actuated to an open or closed position as a function of changes in total weight of fluid in said upper fluid reservoir and said lower fluid reservoir to initiate or terminate flow of unfiltered fluid to said upper fluid reservoir; and
(f) a control arm, wherein the control arm is operatively connected to the fluid supply valve to actuate said fluid supply valve to said open or closed position.

2. The filtration system of claim 1 wherein said platform is supported above said base on a telescopic column comprising a platform telescopic member fixed to said platform in telescoping engagement with a base telescopic member fixed to said base.

3. The filtration system of claim 1 wherein said force reactive linkage includes an indicator for indicating the fluid volume in the filtration system as a function of the total weight of the fluid in the filtration system.

4. The filtration system of claim 1 wherein said force reactive linkage includes a compression spring having one end secured to said platform and an opposite end secured to said base.

5. The filtration system of claim 3 wherein said force reactive linkage includes an extension spring having one end connected to said indicator and an opposite end connected to said base.

6. The filtration system of claim 3 including a coupler link having an upper distal end pivotally connected to said platform and lower distal end pivotally connected to said indicator.

7. The filtration system of claim 3 including a graduated scale mounted on said base.

8. The filtration system of claim 1 wherein said fluid supply valve is mounted on top of said upper reservoir.

9. The filtration system of claim 1 including a movable carriage constrained to travel along a vertically extending stanchion secured to said base.

10. The filtration system of claim 9 wherein said stanchion includes a vertically adjustable extension member.

11. The filtration system of claim 1 including a visual indicator rotatably connected to said base, said visual indicator including an LED fixed to said indicator.

12. The filtration system of claim 11 including an audio indicator configured to generate an audio signal, said audio indicator comprising a bell.

13. The filtration system of claim 12 wherein said fluid supply valve is mounted on top of said upper reservoir.

14. The filtration system of claim 1 including a micro switch operatively connected to a main fluid supply valve.

15. A gravity filtration system, comprising:
(a) a base;
(b) a moveable platform supported above said base;
(c) an upper water reservoir and a lower water reservoir supported on said platform in substantial vertical alignment, a lower end of said upper water reservoir in unsealed mating engagement with an upper end of said lower water reservoir, and wherein said upper water reservoir is in fluid communication with said lower water reservoir;
(d) a force reactive linkage interconnecting said platform to said base;
(e) a fluid supply valve connected to an unfiltered water source, wherein said fluid supply valve is automatically actuated to supply unfiltered water to said upper water reservoir; and
(f) wherein said linkage includes a control arm operatively connected to said fluid supply valve, and wherein said control arm opens and closes said fluid supply valve in response to changes in the total weight of water contained in said upper and lower water reservoirs.

16. The filtration system of claim 15 wherein said fluid supply valve includes an inlet port connected to a pressurized unfiltered water source and an outlet port of said fluid supply valve is connected to a water supply line at atmospheric pressure opening into said upper reservoir.

17. The filtration system of claim 1 wherein said fluid supply valve is automatically actuated to an open or closed position.

18. The filtration system of claim 10, including the control arm operatively connected between said extension member and said fluid supply valve.

* * * * *